United States Patent
Stettner (10) Patent No.: US 8,245,257 B1
(45) Date of Patent: Aug. 14, 2012

(54) SYSTEM AND METHOD FOR DYNAMIC ELECTRONIC PROGRAM GUIDE (EPG) DATA DOWNLOADS

(75) Inventor: Armando P. Stettner, Woodinville, WA (US)

(73) Assignee: ARRIS Group, Inc., Suwanee, GA (US)

( * ) Notice: Subject to any disclaimer, the term of this patent is extended or adjusted under 35 U.S.C. 154(b) by 1450 days.

(21) Appl. No.: 10/261,096

(22) Filed: Sep. 30, 2002

(51) Int. Cl.
*H04N 5/445* (2006.01)

(52) U.S. Cl. ............... 725/54; 725/44; 725/46; 725/51; 725/109; 725/112

(58) Field of Classification Search .................... 725/39, 725/87, 44, 46, 51, 54, 109, 112
See application file for complete search history.

(56) References Cited

U.S. PATENT DOCUMENTS

| | | | | |
|---|---|---|---|---|
| 5,592,551 | A * | 1/1997 | Lett et al. | 380/211 |
| 6,020,880 | A * | 2/2000 | Naimpally | 725/48 |
| 6,317,883 | B2 | 11/2001 | Marics | 725/56 |
| 6,357,043 | B1 | 3/2002 | Ellis et al. | 725/61 |
| 6,442,757 | B1 | 8/2002 | Hancock et al. | 725/50 |
| 6,452,611 | B1 | 9/2002 | Gerba et al. | 345/721 |
| 2001/0048752 | A1* | 12/2001 | Miki et al. | 382/100 |
| 2002/0049978 | A1* | 4/2002 | Rodriguez et al. | 725/86 |
| 2002/0059623 | A1* | 5/2002 | Rodriguez et al. | 725/91 |
| 2002/0073426 | A1* | 6/2002 | Bhatt | 725/46 |
| 2002/0104099 | A1* | 8/2002 | Novak | 725/136 |
| 2002/0184047 | A1* | 12/2002 | Plotnick et al. | 705/1 |
| 2003/0066085 | A1* | 4/2003 | Boyer et al. | 725/104 |
| 2003/0083533 | A1* | 5/2003 | Gerba et al. | 585/367 |
| 2003/0149988 | A1* | 8/2003 | Ellis et al. | 725/87 |
| 2004/0073923 | A1* | 4/2004 | Wasserman | 725/46 |
| 2005/0028206 | A1* | 2/2005 | Cameron et al. | 725/46 |
| 2006/0010470 | A1* | 1/2006 | Kurosaki et al. | 725/46 |
| 2006/0064721 | A1* | 3/2006 | Del Val et al. | 725/41 |
| 2006/0248555 | A1* | 11/2006 | Eldering | 725/34 |
| 2007/0055709 | A1* | 3/2007 | Jung et al. | 707/201 |

* cited by examiner

*Primary Examiner* — Nasser Goodarzi
*Assistant Examiner* — Jivka Rabovianski
(74) *Attorney, Agent, or Firm* — Troy A. Van Aacken; Robert J. Starr (57) ABSTRACT

Set top boxes (STBs) query a source of electronic program guide (EPG) data to request only the EPG data that it needs. Thus, instead of downloading the entire set of EPG data, the STBs query the source for only a limited amount of EPG data, such as data for the next 2-3 hours of programming. STBs can dynamically request additional EPG data if it needs to do so while a user is perusing the EPG, such as when the user requests additional EPG data that may not have been previously downloaded. Updates and corrections to pieces of EPG data can be efficiently made and sent to the STB, when that EPG data is needed, rather than being sent only during regularly scheduled times along with the entire set of EPG data.

19 Claims, 5 Drawing Sheets

SYSTEM AND METHOD FOR DYNAMIC ELECTRONIC PROGRAM GUIDE (EPG) DATA DOWNLOADS

BACKGROUND OF THE INVENTION

1. Field of the Invention

This disclosure relates generally to electronic program guides (EPGs), and in particular but not exclusively, relates to dynamically downloading certain EPG data in response to a query for that EPG data.

2. Description of the Related Art

Traditionally, television program guides have been provided in printed form, such as in entertainment magazines or in newspaper pages. These printed program guides lay out the schedule for various television programs in grid-like arrangements that identify the programs, show times, television channels, story lines, actor names, and the like. When a viewer wishes to know when a particular television program is scheduled for broadcast, that viewer can consult the printed program guide to locate the desired information, as opposed to "channel surfing" until the television program is located.

Electronic program guides (EPGs) are now as common as printed program guides. A common form of EPG is a grid-like arrangement of television program information that is graphically overlaid over any current television channel whenever the viewer presses a "GUIDE" button or other button on a remote control. Typically, EPG software is built into a television or set top box (STB) to render the on-screen EPG when the viewer presses the GUIDE button. Updated EPG data is generally downloaded into the receiving television and/or STB circuitry on a regular daily basis, such as late in the evening when bandwidth utilization on an out-of-band channel is low.

In typical implementations of these forms of EPGs, the EPG data is "pushed" to the receiving circuitry based on zip codes and via an out-of-band channel link. For example, when a television or STB is first connected to receive the EPG data, the viewer may be asked to enter his zip code, so that the viewer receives only EPG data relevant to television programs broadcasted to that viewing area. After the zip code is provided, the EPG data is pushed to the receiving circuitry along the out-of-band channel during the update times. Headends may also know the particular channel line-ups that they serve to particular STBs.

Once the EPG data has been downloaded, the viewer can "bring up" the EPG whenever he wishes to view television program information. Some EPGs provide capabilities that allow the viewer to scroll through the listings (usually via use of navigation buttons on the remote control), set recordings, directly tune to particular television channels via the EPG, obtain additional information about listed television programs from the EPG, and so forth.

In areas where there are large numbers of available channels, it becomes an onerous task for the viewer to peruse a lengthy EPG (having program information for all of the available channels) in order to locate just one or two desired television program listings—most viewers are generally interested in searching for a few pieces of upcoming television programming for the next hour or two, rather than reviewing all of the television program information for the upcoming week. Moreover, downloading the complete channel lineup of EPG data for the upcoming week, in situations where there are a large number of television channels available, can seriously monopolize bandwidth capacity, thereby resulting in lengthier downloading times and requiring more stringent bandwidth traffic management. Another problem is that if any single piece of EPG data needs to be updated or corrected, the corrected piece of EPG data is not provided to the STB until the next scheduled download time—and even then, the corrected piece of EPG data has to be downloaded along with the entire lineup of EPG data, rather than as an individual update. As the number of available television channels increase, the amount of EPG data that has to be downloaded and managed using existing techniques also increase, thereby stretching bandwidth capacities, EPG software processing requirements, and other resources to their limits.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of techniques to dynamically download EPG data are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention allows client terminals, such as set top boxes (STBs), to make queries to a server (or other source of EPG data) asking for only the EPG data that it needs. Thus, instead of downloading the entire N days of EPG data (where N may be in terms of number of days, such as 7 days, or number of weeks, such as 2 weeks, or other measure), the STBs query the server for only portions of the EPG data, such as EPG data for only the next two hours or so. Alternatively or in addition, the server can periodically broadcast or multicast the next two or three hours of EPG data, at which point the STBs can capture the EPG data and process it.

Additionally in an embodiment, STBs can dynamically request additional EPG data if it needs to do so while a viewer (or user) is perusing the EPG. For example, if the viewer is navigating through the EPG and perusing previously downloaded EPG data, the STB can query the server for more EPG data that may not have been previously downloaded. Thus, the viewer may be perusing previously downloaded EPG data by category (which was previously downloaded), and if the viewer then wishes to view additional not-yet-downloaded information about a particular category, the STB can request that additional information from the server. To the viewer, however, the latency at which the additional information is provided can be minimal, thereby making the operation transparent to the viewer.

By providing EPG data in this manner, a multiple system operator (MSO) or other EPG provider can save precious out-of-band bandwidth by not having to carousel or otherwise transmit all of the EPG data all of the time. STBs that use narrow-bandwidth out-of-band channels can generate reasonably well-populated EPGs much sooner than under current schemes. Moreover, one embodiment of the invention provides a much more timely delivery of EPG data. Current schemes that provide EPG data for a few days worth (or a week or two's worth) of television programming at a single download will generally be unable to deliver or otherwise miss updates for the current day, for instance. Therefore, one embodiment of the invention provides dynamic downloads that can provide updates for the current day or other time slot when an update becomes available.

In addition, by establishing a query/response approach as opposed to the current monolithic download approach, simpler and shorter developments of STBs may be accomplished by one embodiment of the invention. Less STB-computing resources for processing the EPG data will be needed and simpler protocols may be defined, since less EPG data is being provided.

The EPG data can also be much more timely and easier to update by one embodiment of the invention. Rather than changing and sending the entire set of EPG data, changes can be made to individual pieces of EPG data, which are then immediately available to STBs when they query for that EPG data or are otherwise individually provided with that EPG data.

Figure 1:
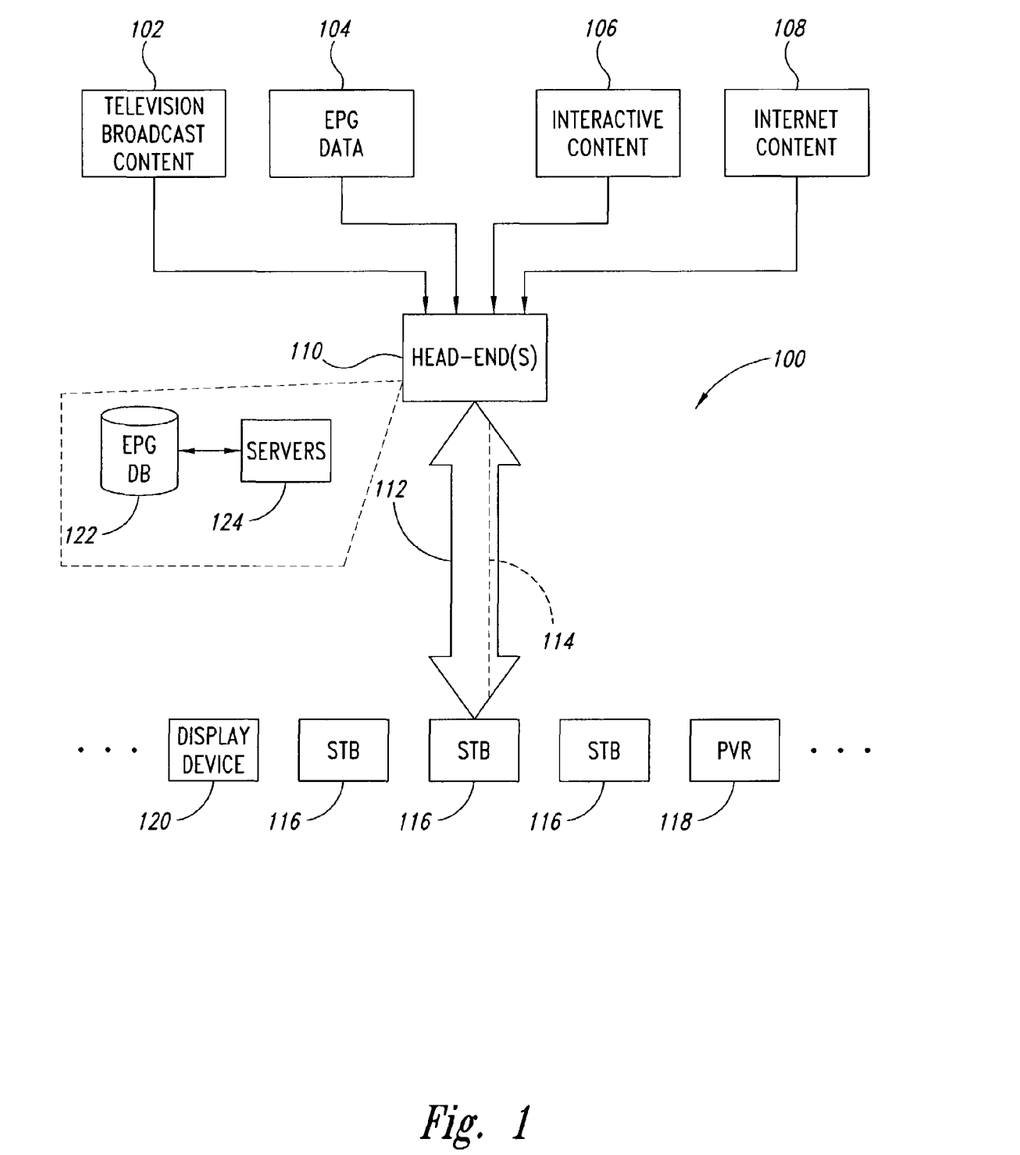
FIG. 1 is a block diagram of a system in which an embodiment of the invention may be implemented to dynamically download EPG data.

FIG. 1 is a block diagram of a system 100 in which an embodiment of the invention may be implemented to provide dynamic EPG data downloads. The system includes a television broadcast content source 102 to provide television programs and other video for distribution to viewers. The television content source 102 can comprise television networks and broadcasters, local or national television studios, production studios, and other known types of video content providers.

The system 100 includes an EPG data production source 104 to generate EPG data. The EPG data production source 104 may be provided by a party such as multiple system operator (MSO), production studio, broadcaster, or other party having the capability to generate EPG data that can be downloaded to viewer televisions or other receiving devices. The EPG data production source 104, by having access to television broadcast schedules, content subject matter information, channel lineups for different geographical viewing regions, etc., can process all of this information into EPG data that can be distributed to the relevant viewing regions. There are several techniques known in the art for generating EPG data, and for the sake of brevity, such techniques will not be described in detail herein.

If the system 100 provides interactive television capabilities to its viewers, the system 100 may include one or more interactive content sources 106. For instance, an MSO may operate the interactive content source 106 to provide its viewers with supplemental information that accompanies television broadcasts, interactive content channels, on-line electronic commerce opportunities, interactive content via an EPG, and the like. The system 100 may also include an Internet content source 108, such as servers, web sites, portals, or other mechanism by which viewers may access the Internet via their televisions.

The sources 102-108 are in turn coupled to one or more distribution centers, such as head-ends 110. Each head-end 110 typically services televisions in a particular viewing area, by receiving content from the sources 102-108 and then distributing the content to its subscriber televisions. The head-end 110 includes or is otherwise coupled to an EPG database 122. The EPG database 122 stores EPG data received from the EPG data production source 104 (typically EPG data corresponding to television programming or other content intended for receiving devices served by the head-end 110). The EPG database 122 can also store updated or corrected EPG data, EPG data that has been processed (such as via addition of graphics, links, or other type of processing) subsequent to being received from the EPG data production source 104, EPG data that has been addressed or otherwise prepared for transmission to appropriate receiving devices, and so forth.

It is appreciated that the EPG data need not necessarily be stored in the EPG database 122. The EPG data may be stored in other machine-readable media or data repository in formats other than database entries. For example, the EPG data may be stored as files, text, extensible markup language (XML) objects, and others and combinations thereof.

One or more server(s) 124 is coupled to the EPG database 122 to process the EPG data stored therein and to send the EPG data to the appropriate receiving devices. For instance, the server 124 can receive queries for certain pieces of EPG data, retrieve that requested EPG data from the EPG database 122, format the retrieve EPG data (if necessary), and then send the EPG data to the receiving device that sent the query. Alternatively or in addition, the server 124 can pull pieces of EPG data from the database 122 and periodically broadcast (or multicast) that EPG data to receiving devices.

The server 124 can be embodied in different formats according to various embodiments of the invention. The server 124 can be a carousel server, for instance, that carousel broadcast selected EPG data on an out-of-band channel. The server 124 may use other EPG transmission techniques different from carousel broadcasting, including a query and response technique. The server 124 itself need not necessarily be used to send EPG data. Those skilled in the art having the benefit of this disclosure would appreciate that non-server devices may be used to dynamically provide EPG data in accordance with an embodiment of the invention. Thus, the EPG database 122 and the server 124 comprise only one example of an EPG data source that may be used in an embodiment of the invention.

In one embodiment, each head-end 110 distributes its content to subscriber televisions by way of a distribution network 112 in the form of a hybrid fiber coaxial (HFC) cable distribution network. The content distributed via the distribution network 112, such as video programs, can be in analog or digital. For instance, content transmitted in digital form can be transmitted via Motion Pictures Expert Group (MPEG) streams. It is appreciated that the distribution network 112 need not necessarily be limited to hardwire distribution networks. For example, all or parts of the distribution network 112 can comprise optical, satellite, radio frequency, microwave, or other wireless link. Moreover, the distribution network 112 may comprise combinations of both hardwire and wireless links.

In one embodiment, the distribution network 112 can include one or more EPG communication links 114 that provide EPG data to receiving devices. The EPG communication link 114 can comprise an out-of-band channel, which is a frequency carried by the coaxial cable that is dedicated for EPG data (or other additional information). As a person skilled in the art having the benefit of this disclosure would appreciate, the EPG communication link 114 can be provided via other techniques in some embodiments. These techniques may include, but not be limited to, MPEG streams, analog transmissions, Ethernet or Internet connection, download via telephone lines, and so forth.

One or more STBs 116 are communicatively coupled to the distribution network 112 to receive the television broadcasts, EPG data, interactive content, etc. from the head-end 110. The STBs 116 may be separate devices coupled to televisions, or televisions may have built-in STB functionality. Alternatively or in addition, other types of receiving devices may be coupled to the distribution network 112 to receive EPG data. One example is a personal video recorder (PVR) 118 that can record programming and other content sent via the distribution network 112, and in one embodiment, can also query for and process EPG data. It is appreciated that any of the STBs 116 may also have this PVR functionality.

Alternatively or in addition, display devices 120 can also comprise the receiving devices that are capable to receive and process EPG data sent via the distribution network 112. These display devices 120 can include, according to various embodiments, televisions with STB functionality, wireless devices, personal computers, pagers, or other type of display device that can request and process EPG data.

Figure 2:
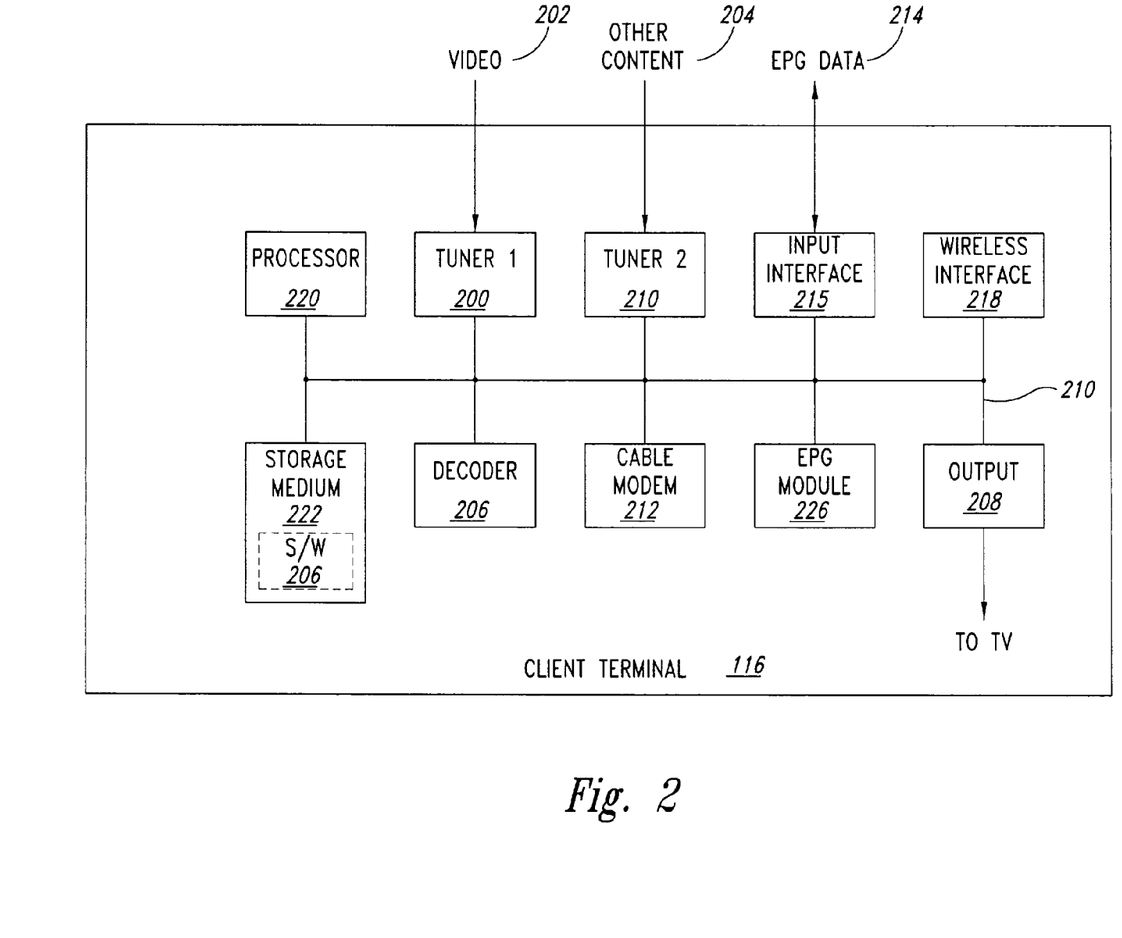
FIG. 2 is a block diagram of an embodiment of a client terminal for the system of FIG. 1 that can implement an embodiment of the invention to receive dynamically downloaded EPG data.

FIG. 2 is a block diagram of an embodiment of a client terminal or other receiving device, such as one of the STBs 116, for the system 100 of FIG. 1 that can implement an embodiment of the invention to receive dynamically downloaded EPG data. For the sake of simplicity of illustration and explanation, only the components that are germane to understanding an embodiment of the invention are shown in FIG. 2. It is understood that the embodiment of the STB 116 shown in FIG. 2 can have other components. Moreover, the various illustrated components may be suitably combined in some embodiments, instead of being separate. A bus 201 is shown symbolically to depict coupling between the various components.

The STB 116 comprises a first tuner 200 to tune to a television signal, Motion Pictures Expert Group (MPEG) stream, or other video source 202. The video source 202 may include audio and video, live analog transmission, or other content that can be received from the distribution network 112.

The first tuner 200 is coupled to a decoder 206 that decodes the video and other received content into a format that is compatible with a television set coupled to the STB 116. The STB 116 may include a second tuner 210. The second tuner 210 can work in conjunction with a cable modem 212 to obtain other content 204 from the Internet content source 108, the interactive content source 106, or other source, such as via a DOCSIS channel. In one embodiment, some of the EPG data may be received via the second tuner 210.

An embodiment of the client terminal 108 may include a processor 220 to control operation of the various components shown in FIG. 2. The processor 220 may work in conjunction with software or other machine-readable instructions stored on a machine-readable storage medium 222. Such software may cooperate with the processor 220 to manage EPG operation, including but not limited to, rendering an EPG template, populating the template with EPG data, querying the server 124 for EPG data, monitoring received transmissions for EPG data, interpreting user requests for EPG data, managing PVR operations to schedule recordings based on EPG data, and so forth. Alternatively or in addition to the software, at least some of these EPG-related operations may be performed by an EPG module 226. The EPG module 226 may be a separate software module or integrated with the software.

In addition, the STB 116 includes or is coupled to a third tuner or other input interface 215. In an embodiment, the third tuner 215 can be an out-of-band tuner capable to receive EPG data 214 via the EPG communication link 114, alternatively or in addition to receiving such EPG data from the second tuner 210 or other tuner. In some embodiments, instead of or in addition to an out-of-band tuner, the input interface 215 can comprise a network interface or other communication interface. Examples include a telephone interface; an Ethernet port; an interface to a personal computer, audio system (e.g., CD players, home entertainment system, and the like), video recorder/player device, data storage system (e.g., hard disks, CDs, and the like); and so forth.

An output interface 208 provides output from the STB 116 to a television or other display device. This output can include television programs, an EPG, interactive content, Internet content, and so forth. A wireless interface 218 receives commands from a user input device, such as a remote control (not shown). Such user commands can include commands to navigate through an EPG; select EPG entries for tuning, displaying detailed information, recording, or others; requesting additional EPG information; and others.

Figure 3:
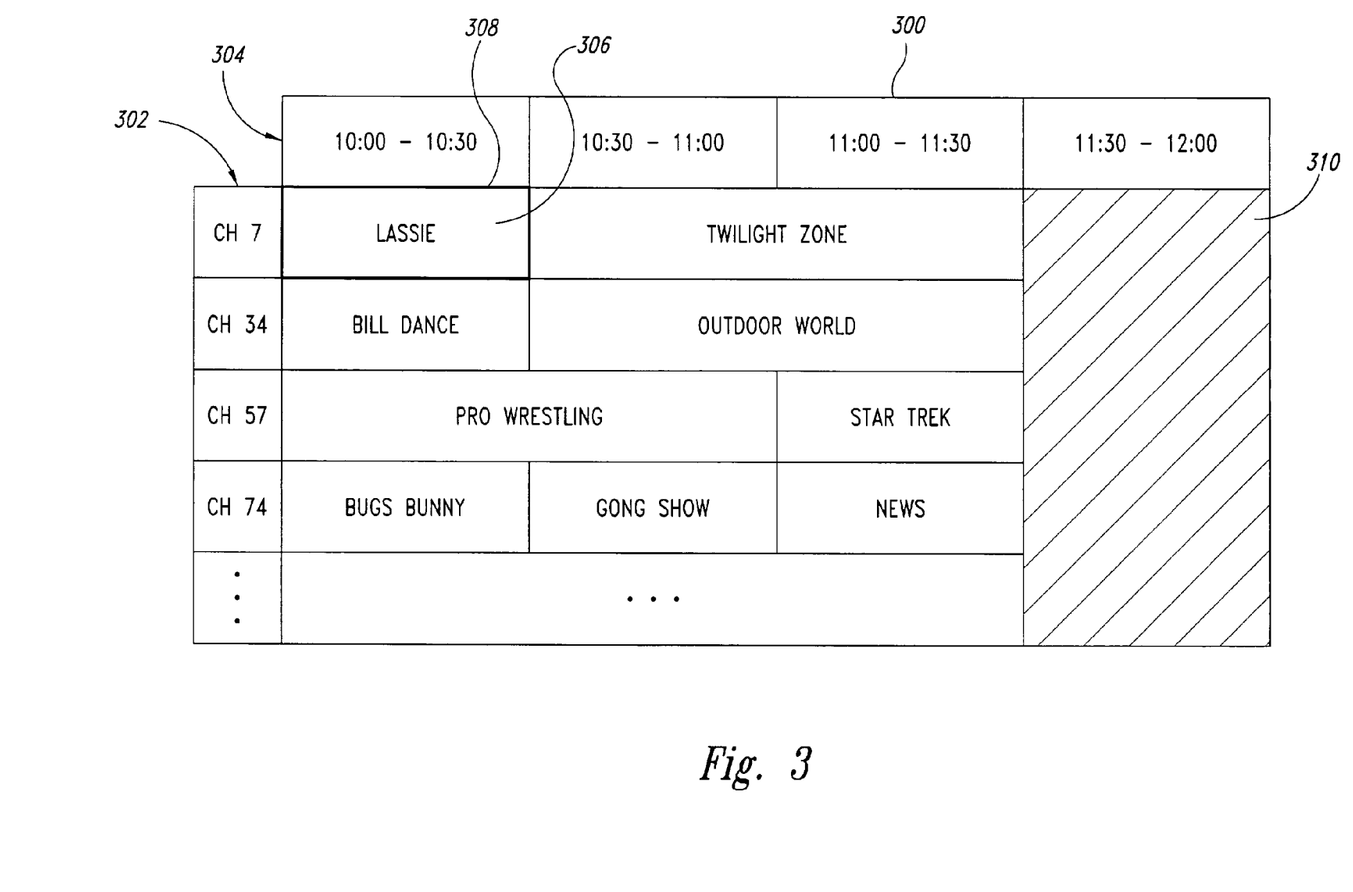
FIGS. 3-5 illustrate operation of an example EPG in accordance with various embodiments of the invention.

FIG. 3 shows an EPG 300 in accordance with an embodiment of the invention. It is appreciated that the content, format, layout, or other characteristics of the EPG 300 are merely illustrative, and that variations are possible in other EPGs. The EPG 300 is rendered by the EPG module 226 to have channel identifiers 302 and time slots 304 (which together comprise a full broadcast schedule, such as a day's worth of television programming), and is populated with television program information for the listed channels and time slots.

For example, a television program 306 ("Lassie") is depicted as being scheduled for broadcast from 10:00-10:30 on Channel 7. Other television programs are indicated in the EPG 300 for broadcast anywhere between 10:00 and 11:30. A movable selection rectangle 308 (or other selection feature) allows the user/viewer to navigate within the EPG 300, such as via use of arrow buttons on a remote control. When the selection rectangle 308 is positioned over a desired entry, the user may press an INFO, OK, or other button(s) on the remote control to obtain additional details, tune to that program, record that program, or other operations.

One embodiment of the EPG 300 downloads only a limited amount of EPG data, such as for only a few hours rather than for the entire day. This is indicated in FIG. 3 by a shaded region 310 for the 11:30-12:00 time slot (and onward) where no EPG data has been downloaded. In one embodiment, EPG data for all channels for only limited time slots is downloaded. In another embodiment, EPG data for only certain channels for only limited time slots is downloaded. Variations are possible to reduce the amount of EPG data per download period.

Figure 4:
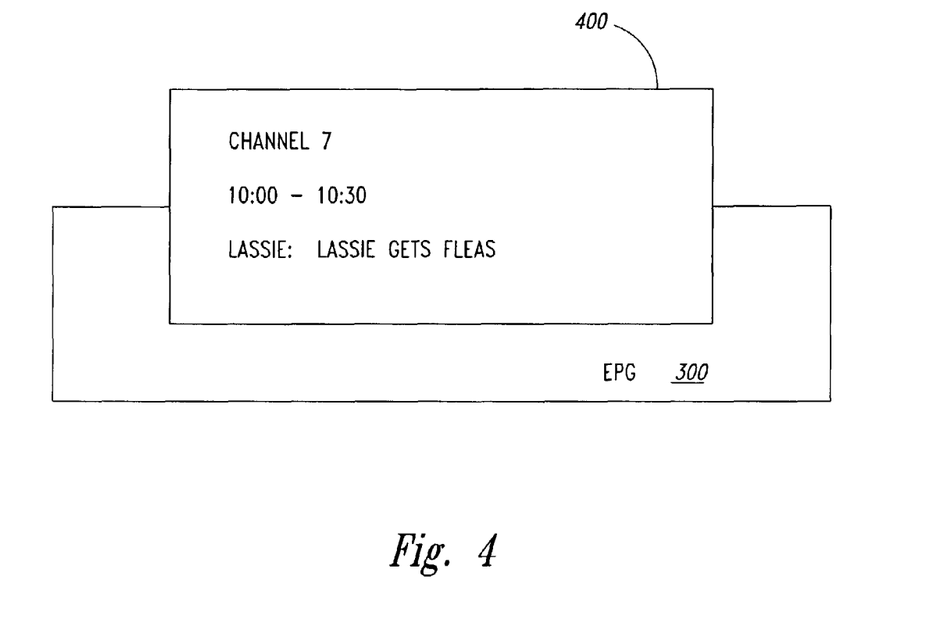

FIG. 4 illustrates operation of the EPG 300 in connection with dynamically downloading user-requested EPG data. For instance, the user may navigate the selection rectangle 308 over the entry 306 for the Lassie television program, and then press the INFO button on the remote control to view additional information about that episode. Upon receiving this user command, the EPG module 226 recognizes that the user command is a request for information about the Lassie episode, and queries the server 124 for the requested information. The server 124 receives the query, retrieves the requested information from the EPG database 122, and sends or downloads the requested information to the STB 116.

Upon receipt of the requested information, the EPG module 226 inserts the requested information into the EPG 300. As depicted in FIG. 4, the requested information may be rendered in a window 400 of the EPG 300. The downloaded episode description in this example is "Lassie gets fleas."

In the example of FIG. 4, the viewer requested additional information regarding a currently downloaded television program entry. In an embodiment, the viewer may also receive dynamically downloaded EPG data related to television programs for which nothing has yet been downloaded. For instance, if the viewer navigated the selection rectangle to the shaded area 310 to view not-yet-downloaded program information on Channel 7 from 11:30-12:00, the EPG module 226 can query the server 124 for that future EPG data. Such requested EPG data can then be downloaded and rendered in a manner similar to what is shown in the window 400.

Figure 5:
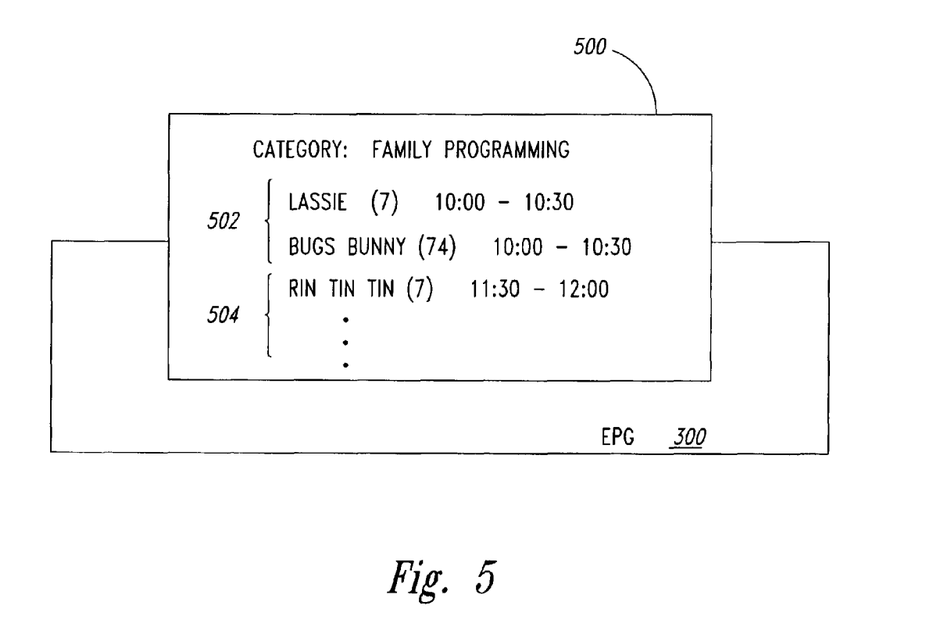

FIG. 5 illustrates another operation of the EPG 300 in connection with dynamically downloading user-requested EPG data. Assume that the user has selected an EPG option to view schedules of upcoming television programs based on a category, such as sports, family programming, comedy, etc. As a result, a window 500 of the EPG 300 is rendered, which lists television program schedules for family programming. The window 500 can present programming information 502 from currently downloaded EPG data (e.g., television program listings from 10:00-10:30 on Channels 7 and 74).

Moreover, the EPG module 226 can dynamically query the server 124 for television program listings specific to that category for all channels (or certain channels) for the short-term future, which has not yet been previously downloaded. In the example of FIG. 5, one or more television program listings 504 (e.g., for "Rin Tin Tin") from the time slot 11:30-12:00 (e.g., the shaded region 310) is dynamically downloaded by the EPG module 226 and rendered in the window 500. Should the time of broadcast, episode description, or television program change, the server 124 can send only the relevant updated information in response to a query from the STB 116.

In the depicted embodiments of FIGS. 3-5, at least some of the EPG data was provided to the EPG 300 via a query and response technique. In an embodiment, at least some of the EPG data may be provided independent of a query and response technique. For example, the 2-hour blocks of EPG data (or other limited-duration blocks of EPG data) may be provided via regularly scheduled download from the server 124 (or other EPG data source). These downloads can be staggered throughout the day to maximize bandwidth efficiency, taking into account times of the day when there is maximum and minimum bandwidth usage. For example, bandwidth usage may be less during weekday daylight hours (when many people are at work and not watching television) as compared to weekday evening hours. Moreover, more timely EPG updates can be provided, such as EPG updates for television programs to be provided for the current day.

The EPG data downloads may be broadcast, multicast, or unicast. Moreover, the limited-size EPG data downloads may be performed via carousel transmission during certain times (rather than all EPG data constantly), where the server 124 carousel transmits EPG data, and the corresponding STBs 116 pick off the relevant EPG data that they need. The STBs may have multiple opportunities to pick off the desired EPG data during a 3-hour period, for instance. In non-carousel implementations, STBs 116 can directly receive the EPG data that they need, either with a response and query technique or via other technique independent of responses and queries. Suitable combinations of all of these downloading techniques may also be used.

One embodiment of the invention can also be implemented for use with PVRs, such as the PVR 118. Users of PVRs typically record television programs that are scheduled for the next few hours (or next day or two). When the user programs the PVR 118 to record a certain television program, the PVR 118 can check the currently downloaded EPG data for schedule information and resolve any possible scheduling conflicts. Furthermore, the PVR 118 or other recording device can request from the server 124 and dynamically receive EPG data that it can use to schedule a recording or to resolve a scheduling conflict.

By limiting the amount of EPG data that is downloaded, narrower out-of-band channels may be used. Alternatively or in addition, out-of-band channels of conventional bandwidth may be used, except less of the bandwidth is utilized for EPG data downloads. Therefore, the unused bandwidth may be used to convey other information, such as control information, interactive content, or other types of data.

Figure 6:
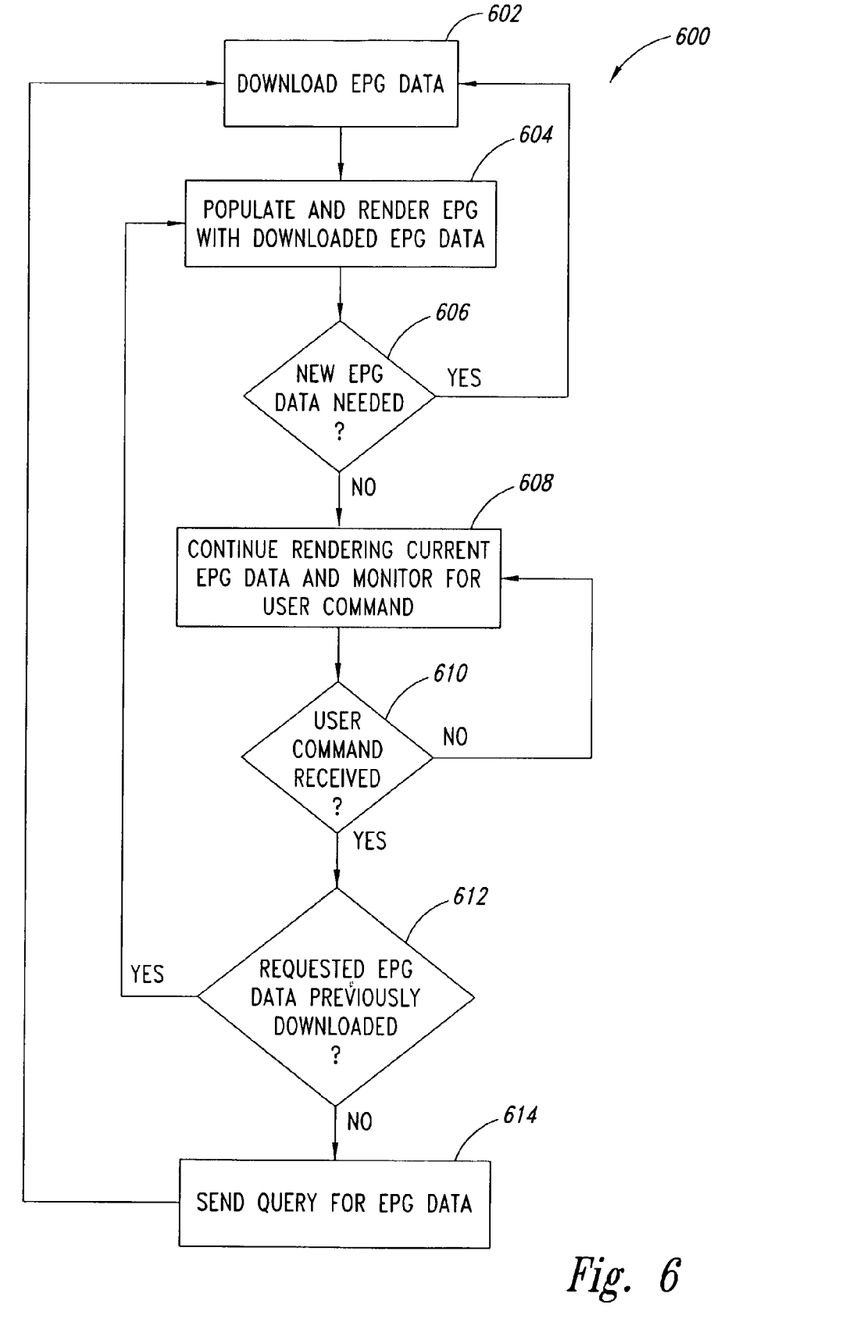
FIG. 6 is a flowchart illustrating operations associated with dynamic download of EPG data according to an embodiment of the invention.

FIG. 6 is a flowchart 600 illustrating operations associated with dynamic download of EPG data according to an embodiment of the invention. At least some of the various operations depicted in FIG. 6 may be performed at the STB 116 by the software, by the EPG module 226, or by other components or combinations thereof. Where appropriate, certain operations depicted in the flowchart 600 may be analogized as being performed at the head-end 110 (such as at the server 124) or other remote location (such server-side operations of receiving a query, instead the client-side operation of sending a query). Elements of the flowchart 600 may be embodied in software or other machine-readable instruction stored on a machine-readable medium, such as the storage medium 222 or storage location at the head-end 110. Moreover, the operations shown in the flowchart 600 need not necessarily occur in the exact order shown.

At a block 602, EPG data is downloaded to the STB 116. This operation may occur using any of the previously described techniques to obtain EPG data for a block of time (such as for the next 2-3 hours) as opposed to the entire N day(s). Corrections or revisions to previously downloaded EPG data may also be downloaded at the block 602, as individual pieces of corrective EPG data, rather than as part of a full download for the entire channel lineup.

At a block 604, a template for the EPG 300 is populated by the EPG module 226, and the EPG 300 is rendered. It is noted that the EPG 300 need not necessarily be rendered at the block 604 after it has been populated—the EPG 300 may be rendered only in response to a user command to render the EPG 300 (such as by pressing a GUIDE button on the remote control).

At a block 606, the EPG module 226 determines whether new EPG data is needed. For example, if EPG data is being downloaded in 2-hour blocks, the EPG module 226 may track the times when it needs to request and process the next 2-hour blocks of EPG data. Alternatively or in addition, the EPG module 226 may determine that EPG data is needed if some EPG data is missing from the EPG 300 or if a user command requesting EPG data (which is unavailable) is received.

If the EPG module 226 determines at the block 606 that new EPG data is needed, then a query for that EPG data is sent to the server 124 (or the desired EPG data is conveyed in other ways), and the EPG data is downloaded at the block 602. If no new EPG data is needed, then the EPG module 226 continues to render the current EPG data in the EPG 300 at a block 608. At the block 608 (or at any other blocks), the EPG module 226 may monitor for user commands, which may be received via the wireless interface 218.

Such user commands may be requests for additional information regarding current listings, request for information about future television programs for which EPG data has not yet been downloaded, recording instructions, instructions to tune to a certain channel via selection of one of the listed entries in the EPG 300, and others. If no user commands are received at a block 610, then the monitoring continues at the block 608. However, if a user command is received at the block 610, and the user command relates to viewing EPG data, then the EPG module 226 determines at a block 612 whether the requested EPG data has been previously downloaded.

As depicted in FIGS. 3-5, the requested EPG data may relate to listings for the next time slots, additional information regarding currently downloaded listings, categorical information, and so forth. Some of this information may have been previously downloaded and some may not. Therefore, if the requested EPG data has been previously downloaded, then that EPG data is populated into the EPG 300 (if it has not yet been inserted), and the EPG 300 is rendered with the requested EPG data at the block 604.

However, if the EPG data has not yet been previously downloaded, then a query for that EPG data is sent by the EPG module 226 to the server 124 at a block 614. The server 124 receives the query, pulls the appropriate EPG data from the EPG database 122, and sends that EPG data to the requesting STB 116 for download at the block 602. Thereafter, the requested EPG data can be populated into the EPG 300 and rendered at the block 604, such as depicted in FIGS. 4-5.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

As an example, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to a head-end) may be used to gather programming content, ensure its digital quality, and transmit the signal up to the satellites. Programming may come to the broadcast center from content providers (TBST™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission when appropriate.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method, comprising:
  receiving at a client terminal, on a periodic basis and without a user request, only a portion of available electronic program guide (EPG) data from a remote EPG data source for storage on the client terminal and available for user recall on the client terminal, wherein the portion is limited to EPG data for a limited set of less than all available television channels,
  populating an EPG on the client terminal with the received portion of the EPG data;
  determining, based on a user request for EPG data from the client terminal, that an additional portion of the EPG data is needed at the client terminal; and
  responsive to the user request and prior to a next periodic EPG update, dynamically obtaining via a network request for that additional portion of the EPG data, the network request sent from the client terminal to the remote EPG data source to obtain data to populate into the EPG on the client terminal, wherein the client terminal is connected to a distribution network and accesses the remote EPG data source through an interface to the distribution network.

2. The method of claim 1 wherein dynamically obtaining the additional portion of the EPG data includes downloading that portion of EPG data via an out-of-band channel.

3. The method of claim 1 wherein determining that the additional portion of the EPG data is needed at the client terminal includes:
  monitoring for a user command that requests the additional portion of EPG data on the client terminal; and
  checking the populated EPG on the client terminal for that requested additional portion of the EPG data to see if it is present therein.

4. The method of claim 1 wherein dynamically obtaining the additional portion of the EPG data to populate into the EPG includes dynamically obtaining from the EPG data source, based on the user request for EPG data, EPG data for a time slot in the EPG for which no EPG data was previously received.

5. The method of claim 1 wherein dynamically obtaining the additional portion of the EPG data to populate into the EPG includes dynamically obtaining from the EPG data source, based on the user request for EPG data, EPG data for an EPG category for which no EPG data was previously received.

6. The method of claim 1 further comprising separately receiving an individual update to a previously received portion of the EPG data.

7. The method of claim 1 receiving the portion of EPG data includes receiving, on a periodic basis and without a user request, EPG data for a period of at least one hour but less than 24-hours, and wherein determining that the additional portion of the EPG data is needed includes automatically determining that the period is ending and that EPG data for at least a next period is needed.

8. The method of claim 1 wherein dynamically obtaining the additional portion of the EPG data to populate into the EPG includes querying the EPG data source for that additional portion of the EPG data.

9. The method of claim 1 wherein dynamically obtaining the additional portion of the EPG data to populate into the EPG includes obtaining that additional portion of the EPG data from a carousel transmission.

10. The method of claim 1, further comprising resolving a recording schedule based on the dynamically obtained additional portion of EPG data.

11. A system, comprising:
a source of EPG data; and
a device communicatively coupled to the source of EPG data and remote from the source, the device further being coupled to receive through a distribution network at least one of television broadcast content, interactive content, and Internet content, the device including:
a tuner to receive electronic program guide (EPG) data, on a periodic basis and without a user request, from the source of EPG data, across an interface to the distribution network, for storage on the device and available for user recall on the device, in a manner that each reception of EPG data is limited to EPG data for a limited set of less than all available television channels, wherein the tuner is further operable to send a dynamic, non-periodic user request to the source of the EPG data and receive the dynamically requested EPG data;
a processor coupled to the tuner;
an EPG software program in cooperation with the processor to generate an EPG template and to populate the EPG template with the received EPG data, in a manner that additional EPG data related to the populated EPG data can be requested, based on a user request for EPG data, while the EPG template is generated on a display device; and
an output section communicatively coupled to the processor to provide the EPG template having the received EPG data therein to the display device.

12. The method of claim 1, wherein the portion of available EPG data received at the client terminal on a periodic basis and without user request for storage on the client terminal and available for user recall on the client terminal is limited to EPG data for a limited set of available television channels.

13. The method of claim 1, wherein the portion of available EPG data received at the client terminal on a periodic basis and without user request is limited to EPG data for a period extending only up to of a two hour block.

14. The method of claim 1, wherein the portion of available EPG data received at the client terminal on a periodic basis and without user request for storage on the client terminal and available for user recall on the client terminal is limited to, for each of a plurality of television programs, less than all of the available EPG data for that television program, wherein a remainder of the available EPG data for that television program is dynamically obtainable from the remote EPG data source at a user's request.

15. The method of claim 14, wherein the portion of available EPG data received at the client terminal on a periodic basis and without user request for storage on the client terminal and available for user recall on the client terminal excludes a program description of the plurality of television programs, wherein the program description is dynamically obtainable from the remote EPG data source at a user's request.

16. The method of claim 1, wherein the portion of available EPG data received at the client terminal on a periodic basis and without user request for storage on the client terminal and available for user recall on the client terminal is limited to EPG data for a period extending less than 24 hours from a time at which the EPG data was received at the tuner.

17. The method of claim 1, wherein the portion of available EPG data received at the client terminal on a periodic basis and without user request for storage on the client terminal and available for user recall on the client terminal is limited to a channel, a time, and a title for each television program.

18. The method of claim 17, wherein a program description is dynamically obtainable from the remote EPG data source at a user's request.

19. The method of claim 1, wherein the portion of available EPG data received at the client terminal on a periodic basis and without user request is limited to EPG data for a period of a three hour block.

\* \* \* \* \*